A. TROSCH.
TOOL HOLDER.
APPLICATION FILED AUG. 25, 1919.
1,432,500. Patented Oct. 17, 1922.
2 SHEETS—SHEET 2.
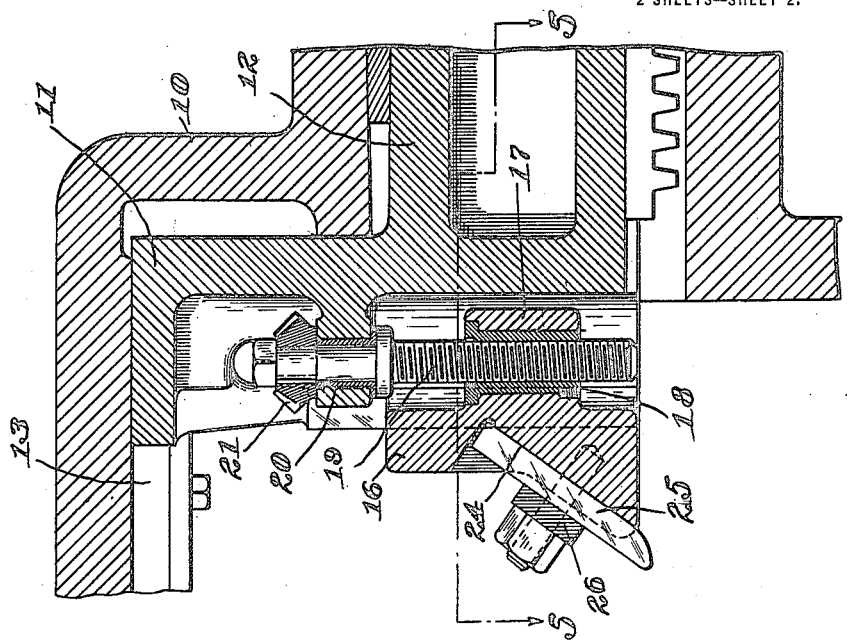
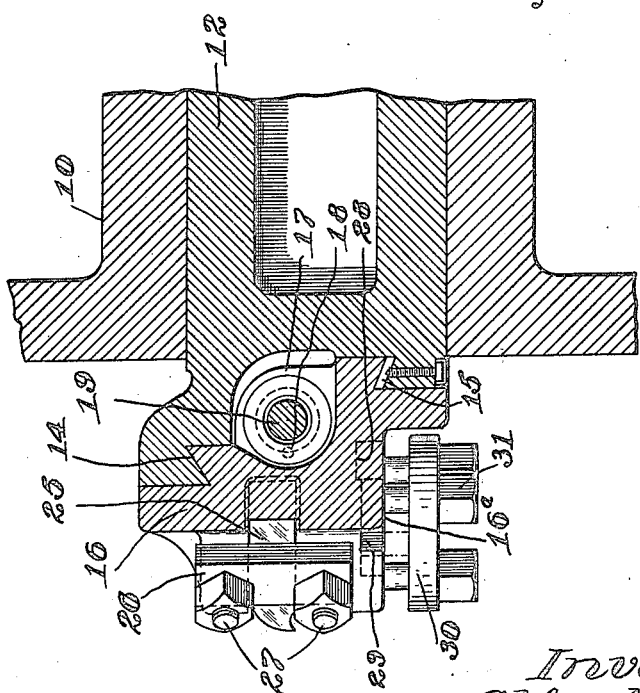
Inventor
Alfred Trosch,
by Clyde L. Rogers
his Attorney.

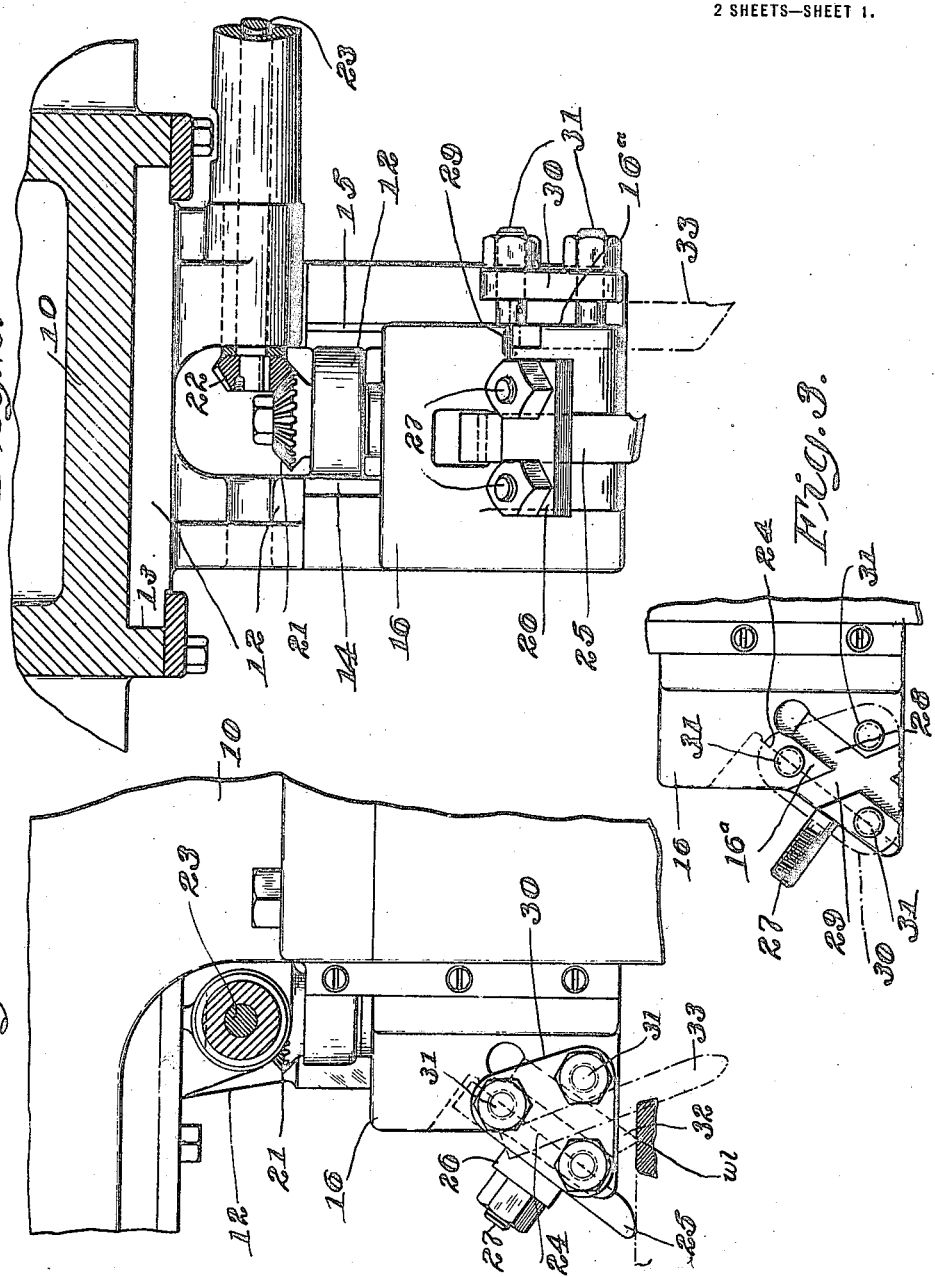

Patented Oct. 17, 1922.

1,432,500

UNITED STATES PATENT OFFICE.

ALFRED TROSCH, OF ROCHESTER, NEW YORK, ASSIGNOR TO ARTHUR H. INGLE, OF ROCHESTER, NEW YORK.

TOOL HOLDER.

Application filed August 25, 1919. Serial No. 319,569.

*To all whom it may concern:*

Be it known that I, ALFRED TROSCH, a citizen of the United States, and resident of Rochester, county of Monroe, State of New York, have invented an Improvement in Tool Holders, of which the following description, in connection with the accompanying drawings, is a specification, like characters on the drawings representing like parts in each of the several views.

This invention relates to tool holders for boring, turning and finishing uses and while having other and more general fields of usefulness is well adapted and designed for use in a boring mill for facing and finishing the rims and hubs of car wheels and the like and which may have a general organization and work table broadly similar to that shown in the patent to Bullard et al No. 877,403 patented January 21, 1908. A principal object of the invention is to provide a tool holder adapted to support the tool strongly and rigidly close to the cutting point and capable of receiving and holding different tools at will in various operative positions best adapted for varying uses such as for facing the flange side of the rim; facing the flange side of the hub, marking the wear line, cleaning the outside of the rim, etc. A further object is to provide a tool holder of the kind stated that is simple and of few parts and easily manipulated for securing and removing the several tools as required. The foregoing and other objects and advantages of the invention will more fully appear from the following detailed description, and the distinctive features of novelty will be pointed out in the appended claims.

Referring to the drawings:

Fig. 1 is a side elevation of a tool holder constructed in accordance with my invention, a portion of the mounting therefor being shown and the operating connection thereto being in section;

Fig. 2 is a plan view thereof with a portion of the mounting in section;

Fig. 3 is a fragmentary side elevation of the tool holder with the tools and certain of the clamping means therefor removed;

Fig. 4 is a lengthwise vertical section of the tool holder; and

Fig. 5 is a section on line 5—5 of Fig. 4.

10 indicates a portion of the machine frame work and housing to which the tool holder of the invention is applied. In this housing is guided for adjustment a head 11 having a shank 12 extending inwardly therefrom which may be equipped with operating means (not shown) for effecting power movement of said head. The head 11 has backing against the housing 10 which has a stout overhanging guide way 13 with which the top of the head engages. The head 11 has formed thereon co-operative undercut guide walls 14, 15 with which are slidably engaged for vertical adjustment the tool holder proper 16. In accordance with my invention, and as shown, the undercut wall 14 at one side of the head is considerably in advance of the other wall 15, the wall 15 and the adjacent portion of the head being farther back to permit the holder 16 to extend back at that side and afford space for mounting tools laterally thereon as presently explained. The holder 16 has an inwardly extending lug 17 in which is fixed a stationary nut 18 engaged by an adjusting screw stem 19 swivelled at 20 in the head 11 and having fixed at its upper end a bevel pinion 21 which meshes with a co-operative bevel 22 fixed on an operating shaft 23 for vertical adjustment of the tools, suitably journaled in the head. In accordance with my invention the front of the holder 16 is recessed diagonally as indicated at 24 to afford a seat for a tool 25 which may be clamped thereto by a clamp bar 26 and clamp bolts 27 engaging the same at either side of the tool. This tool 25 thus mounted is adapted either for facing the flange side of the hub or for cleaning the outside of the rim of a car wheel. In accordance with my invention the holder 16 at one side where it engages the wall 15 presents a relatively extended lateral face 16$^a$. This face is formed with intersecting oblique recesses 28, 29 either of which is adapted to receive a tool to be clamped thereto by a clamp plate 30 held in place by clamp bolts and nuts 31. I preferably make this clamp plate of generally triangular form with one of the clamp bolts 31 at each corner thereof so that said plate and its clamp bolts are without change or shifting adapted to clamp in place either a tool 32 clamped in the recess 28 or a tool 33 clamped in the recess 29, it being noted that the tool 32 so clamped is adapted for uses such as marking the wear line $w\ l$ in a wheel rim while the tool 33 is in position adapting it for facing the flange side of the rim and like uses. Thus it is to be observed that the holder 16 is adapted to receive any two of three tools at one time in different positions and each as best adapted for performing its particular work, each of said tools being removable and replaceable by another in an easy and convenient manner, and each of the tools when clamped in place being rigidly and securely held with a support as close to the cutting point as is in any case practicable. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. The combination with a supporting head, of a tool holder mounted for sliding adjustment thereon, said head and said holder having co-operative provision for adjusting said holder positively, said holder equipped to hold a tool at the front thereof and having also a relatively extended side face equipped to hold a tool in either of two different angular positions for the purpose stated.

2. The combination with a head, a tool holder, of means to adjust said holder on said head, said holder having a tool receiving seat on the front thereof with means to clamp a tool therein and having also a relatively extended lateral face with intersecting tool receiving seats adapted to selectively receive an operating tool, and means for clamping a tool in either of said seats.

3. A tool holder having a mounting on an operating head with provision for adjustment thereon, and having a forwardly sloping tool receiving seat on the front thereof with means for clamping a tool thereto and having also a relatively extended lateral face equipped with a plurality of seats adapted to hold a tool at different angles, and means for clamping a tool in either of said seats.

4. A tool holder for a boring or facing mill equipped with a plurality of tool receiving seats on front and lateral faces thereof with means for clamping a tool to any one of said seats.

5. A tool holder for a boring mill or the like equipped with tool receiving seats on front and lateral faces thereof at right angles to each other, said seats adapted to hold a tool selectively at different angles according to the use required thereof.

In testimony whereof, I have signed my name to this specification.

ALFRED TROSCH.